(12) United States Patent
Ehlers et al.

(10) Patent No.: US 9,327,833 B2
(45) Date of Patent: May 3, 2016

(54) AIRCRAFT CABIN INGRESS AND EGRESS DOOR AREA

(71) Applicant: Airbus Operations GmbH, Hamburg (DE)

(72) Inventors: Bernd Ehlers, Hamburg (DE); Mark Herzog, Hamburg (DE)

(73) Assignee: Airbus Operations GMBH, Hamburg (DE)

( * ) Notice: Subject to any disclaimer, the term of this patent is extended or adjusted under 35 U.S.C. 154(b) by 0 days.

(21) Appl. No.: 14/017,369

(22) Filed: Sep. 4, 2013

(65) Prior Publication Data

US 2014/0008492 A1    Jan. 9, 2014

Related U.S. Application Data

(63) Continuation of application No. PCT/EP2012/000871, filed on Feb. 29, 2012.

(60) Provisional application No. 61/449,113, filed on Mar. 4, 2011.

(51) Int. Cl.
 *B64D 11/00* (2006.01)
 *B64D 11/02* (2006.01)

(52) U.S. Cl.
 CPC ............... *B64D 11/00* (2013.01); *B64D 11/02* (2013.01)

(58) Field of Classification Search
 USPC .......................................... 244/118.5, 118.6
 See application file for complete search history.

(56) References Cited

U.S. PATENT DOCUMENTS

| 3,898,704 A | * | 8/1975 | Gallaher et al. | 5/2.1 |
|---|---|---|---|---|
| 6,079,669 A | | 6/2000 | Hanay et al. | |
| 6,152,400 A | | 11/2000 | Sankrithi et al. | |
| 6,273,366 B1 | * | 8/2001 | Sprenger et al. | 244/118.5 |
| 6,474,599 B1 | * | 11/2002 | Stomski | 244/118.5 |
| 6,696,979 B2 | * | 2/2004 | Manten et al. | 340/945 |
| 7,469,861 B2 | * | 12/2008 | Ferry et al. | 244/118.6 |
| 7,472,957 B2 | * | 1/2009 | Ferry et al. | 297/343 |
| 7,523,888 B2 | * | 4/2009 | Ferry et al. | 244/118.6 |
| 7,997,654 B2 | * | 8/2011 | Ferry et al. | 297/342 |
| 8,313,059 B2 | * | 11/2012 | Ferry et al. | 244/118.6 |

(Continued)

FOREIGN PATENT DOCUMENTS

| CN | 1628043 | 6/2005 |
|---|---|---|
| EP | 0867365 | 9/1998 |

(Continued)

OTHER PUBLICATIONS

International Search Report, Jul. 6, 2012.

(Continued)

*Primary Examiner* — Joseph W Sanderson
(74) *Attorney, Agent, or Firm* — Greer, Burns & Crain, Ltd.

(57) ABSTRACT

An aircraft region having an aisle which leads into an aircraft door region and via which passengers can leave the aircraft or enter the aircraft. The aircraft region further has at least one monument, wherein one of the side walls of the monument is adjacent to the aisle in such a manner that the side wall forms one of the lateral boundaries of the aisle. A niche is formed in a portion of the side wall of the monument facing the aircraft door, which niche is so configured that it is able to accommodate a standing person wholly or at least for the most part.

5 Claims, 3 Drawing Sheets

(56) References Cited

U.S. PATENT DOCUMENTS

| | | |
|---|---|---|
| 8,517,307 B2 * | 8/2013 | Saint-Jalmes et al. ..... 244/118.5 |
| 8,720,821 B2 * | 5/2014 | Ferry et al. ................ 244/118.6 |
| 2004/0232283 A1 * | 11/2004 | Ferry et al. ................ 244/118.6 |
| 2005/0103935 A1 | 5/2005 | Sprenger et al. |
| 2006/0058107 A1 | 3/2006 | Dobertin et al. |
| 2007/0069073 A1 * | 3/2007 | Ferry et al. ................ 244/118.6 |
| 2007/0102577 A1 | 5/2007 | Saint-Jalmes et al. |
| 2007/0152100 A1 * | 7/2007 | Saint-Jalmes et al. ..... 244/118.6 |
| 2009/0084897 A1 * | 4/2009 | Ferry et al. ................ 244/118.6 |
| 2009/0261200 A1 * | 10/2009 | Saint-Jalmes et al. ..... 244/118.5 |
| 2009/0302156 A1 * | 12/2009 | Saint-Jalmes et al. ..... 244/118.6 |
| 2010/0019086 A1 * | 1/2010 | Ferry et al. ................ 244/118.5 |
| 2010/0025530 A1 * | 2/2010 | Ferry et al. ................ 244/118.6 |
| 2010/0219292 A1 | 9/2010 | Saint-Jalmes et al. |
| 2013/0043345 A1 * | 2/2013 | Ferry et al. ................ 244/118.6 |
| 2013/0206906 A1 * | 8/2013 | Burrows et al. ............ 244/118.5 |
| 2013/0206907 A1 * | 8/2013 | Burrows et al. ............ 244/118.5 |
| 2014/0210235 A1 * | 7/2014 | Ferry et al. .................... 297/118 |
| 2014/0217239 A1 | 8/2014 | Ehlers |
| 2014/0224929 A1 | 8/2014 | Weitzel |

FOREIGN PATENT DOCUMENTS

| | | |
|---|---|---|
| EP | 0901963 | 3/1999 |
| EP | 1510456 | 3/2005 |
| FR | 2941917 | 8/2010 |
| WO | 2004078301 | 9/2004 |

OTHER PUBLICATIONS

Chinese Office Action, Dec. 29, 2014.

* cited by examiner

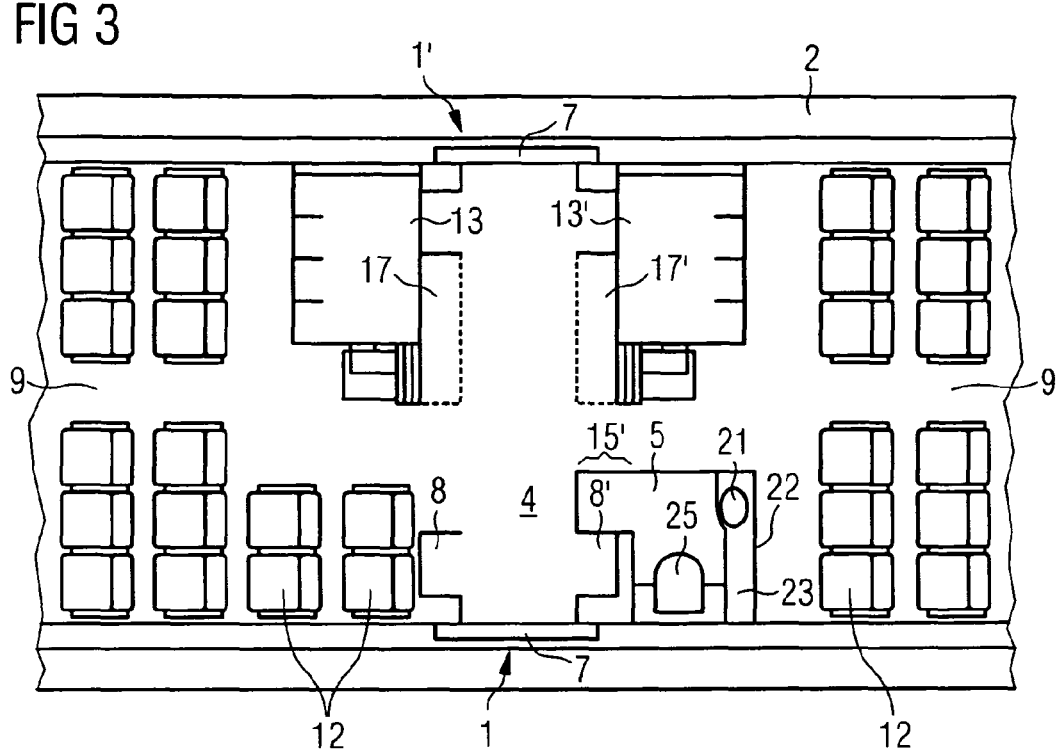
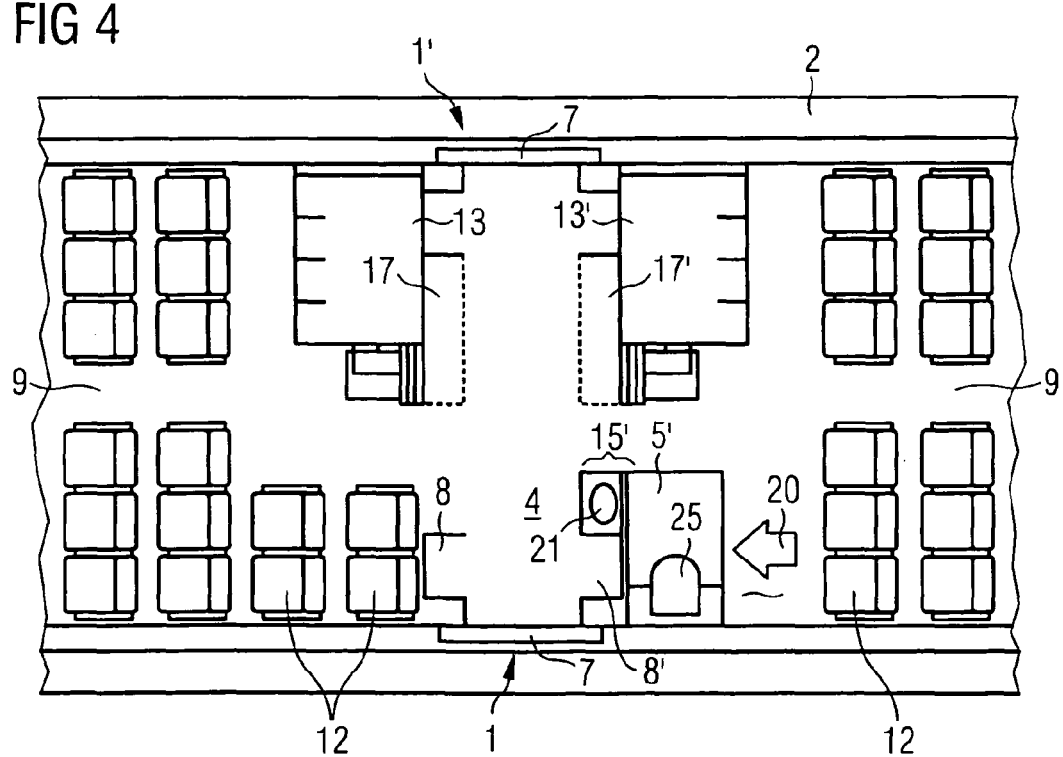

AIRCRAFT CABIN INGRESS AND EGRESS DOOR AREA

CROSS-REFERENCES TO RELATED APPLICATIONS

This application is a continuation of International Application PCT/EP2012/000871 filed Feb. 29, 2012, designating the United States and published on Sep. 13, 2012 as WO 2012/119718. This application also claims the benefit of the U.S. Provisional Application No. 61/449,113, filed on Mar. 4, 2010, and of the German patent application No. 10 2011 013 049.7 filed on Mar. 4, 2010, the entire disclosures of which are incorporated herein by way of reference.

BACKGROUND OF THE INVENTION

The invention relates to an aircraft region which is adjacent to an aircraft door of an aircraft. The invention relates further to an aircraft which has such an aircraft region.

Adjacent to the aircraft door of an aircraft there is conventionally a first aisle (also referred to simply as "aisle" in the application) which runs parallel to the transverse axis of the aircraft (also referred to as the y-direction) and leads into the aircraft interior. From there, the passenger can turn into a second aisle which runs perpendicularly thereto and which, oriented parallel to the longitudinal axis of the aircraft (also referred to as the x-direction), leads into a rear region and a forward region of the aircraft. The first aisle is in most cases bounded at the sides by so-called monuments. Monuments are functional units such as, for example, galley units, lavatory units or stowage units, the outside walls of which can extend from the floor of the aircraft to the roof of the aircraft. Often, both the right-hand boundary and the left-hand boundary of the first aisle are formed by side walls of corresponding monuments.

Because of safety regulations, in an emergency, while passengers are leaving the aircraft, cabin crew must stand ready at the aircraft doors in order to supervise the evacuation of the aircraft and assist the passengers if they have difficulties in leaving the aircraft. The cabin crew usually stand directly at the aircraft door immediately in front of the side wall of the monument (this region is also referred to as the "assist space"). However, in emergencies (e.g., in an emergency landing), it can happen that the panicking passengers push the cabin crew out of the door region (i.e., out of the assist space) and out of the aircraft.

SUMMARY OF THE INVENTION

The object underlying the invention is to configure an aircraft region adjacent to the aircraft door in such a manner that, even in the event of panic in the aircraft, it is ensured that the cabin crew are able to act accordingly in the region of the aircraft door in order to help the passengers and nevertheless not be pushed out of the aircraft.

The aircraft region according to the invention has an aisle which is adjacent to an aircraft door region and via which the passengers can leave the aircraft or enter the aircraft. The aircraft region further has at least one monument, wherein one of the side walls of the monument is adjacent to the aisle in such a manner that the side wall forms one of the lateral boundaries of the aisle, and wherein a niche is formed in a portion of the side wall of the monument facing the aircraft door, which niche is so configured that it is able to accommodate a standing person wholly or at least for the most part.

The configuration of the niche (which serves as the assist space) can be different, according to requirements. For example, the niche can be so configured that one or more persons standing in the niche do not obstruct the passengers as they enter or leave. As a result, in the event of panic, when all the passengers are pushing to leave the aircraft, it is possible for the cabin crew to position themselves in the niche in such a manner that the stream of passengers is guided past the cabin crew without taking the cabin crew with the passengers. On the inside of the niche there can advantageously be provided one or more handles which the cabin crew can hold on to in the event of panic.

The niche can be immediately adjacent to the aircraft door. Alternatively, the niche can also be at a distance from the aircraft door in the y-direction. The footprint of the niche (and accordingly also of the corresponding portion of the side wall of the monument) can be rectangular, triangular, crescent-shaped or of any other desired shape, according to the particular requirements.

A further advantage of the aircraft region according to the invention is that, with the formation of the niche, floor space of the aisle adjacent to the aircraft door that has hitherto been "dead" from the point of view of cabin layout (because it is neither used for fittings nor required by regulations) can at the same time be used by the monument. That is to say, the dimensions of the aisle can be reduced to a minimum (while adhering to the safety standards). The floor space thus saved in the region of the aisle can be used effectively for other purposes, for example for larger monuments, for more leg room in the seats, or for additional seats. In the following, some examples are to be given of how space can optimally be saved in the aisle region and used for other purposes. For example, the monument can have a footprint which, starting from the aircraft door, widens in the y-direction into the aircraft interior (or in other words: which has a reduced width in the region of the niche). A possible footprint of a monument which fulfils these requirements is an (at least substantially) L-shaped footprint which, starting from the aircraft door region, extends along the aisle (i.e., in the y-direction) into the aircraft interior and then bends in order to project along the longitudinal axis of the aircraft (i.e., in the x-direction) in the direction towards the middle of the aisle.

Alternatively, the monument can have a footprint whose width along the aisle is at least substantially constant. For example, the monument can have a footprint which has at least two rectangles offset relative to one another along the longitudinal axis of the aircraft (i.e., in the x-direction). In this embodiment, both the side wall of the monument facing the aisle and the side wall of the monument remote from the aisle extend not in a straight line but in a stepwise manner, in each case a portion of a side wall being offset by a step in the direction towards the longitudinal axis of the aircraft (x-direction).

In both the above variants it is possible to use the space that is gained either for larger monuments or, keeping the monument size the same, for other purposes.

The invention is not limited to the above footprints. Further footprints are possible, for example T-shaped or U-shaped footprints, etc.

The monument can serve very different purposes. For example, the monument, or a portion thereof, can be a galley facility/galley component, a lavatory facility/lavatory component or a stowage facility/stowage component.

If the monument is a washing/lavatory facility, an L-shaped footprint, for example, can be chosen for the monument, in which a toilet bowl or a washbasin is provided in an end of the foot of the L-shaped footprint that is adjacent to the aisle. In this manner, the portion of the monument that projects into the aisle can be used optimally (by the washbasin or the toilet bowl).

In principle, there can be any desired number of monuments adjacent to the aisle. The aisle can, for example, be enclosed at least partly on both sides by monuments. For example, it is possible to provide a first and a second monument which are located opposite one another so that the aisle runs between them. Both the first and the second monument can have identical (mirror-inverted) or alternatively different configurations. For example, each of the monuments can have a niche so that the niches are opposite one another. However, the niches can also be of different sizes or offset relative to one another in the y-direction.

Alternatively, it is possible for a monument or a plurality of monuments arranged next to one another to be adjacent to only one side of the aisle, and for the other side of the aisle to be bounded by a facility that is not a monument, for example a row of seats.

BRIEF DESCRIPTION OF THE DRAWINGS

The invention is explained in greater detail below with reference to the figures in the form of an exemplary embodiment. In the figures:

FIG. 3 shows a schematic representation of a top view of a further aircraft region according to the invention;

FIG. 4 shows a schematic representation of a top view of a further aircraft region according to the invention;

DETAILED DESCRIPTION OF THE PREFERRED EMBODIMENTS

Figure 1:
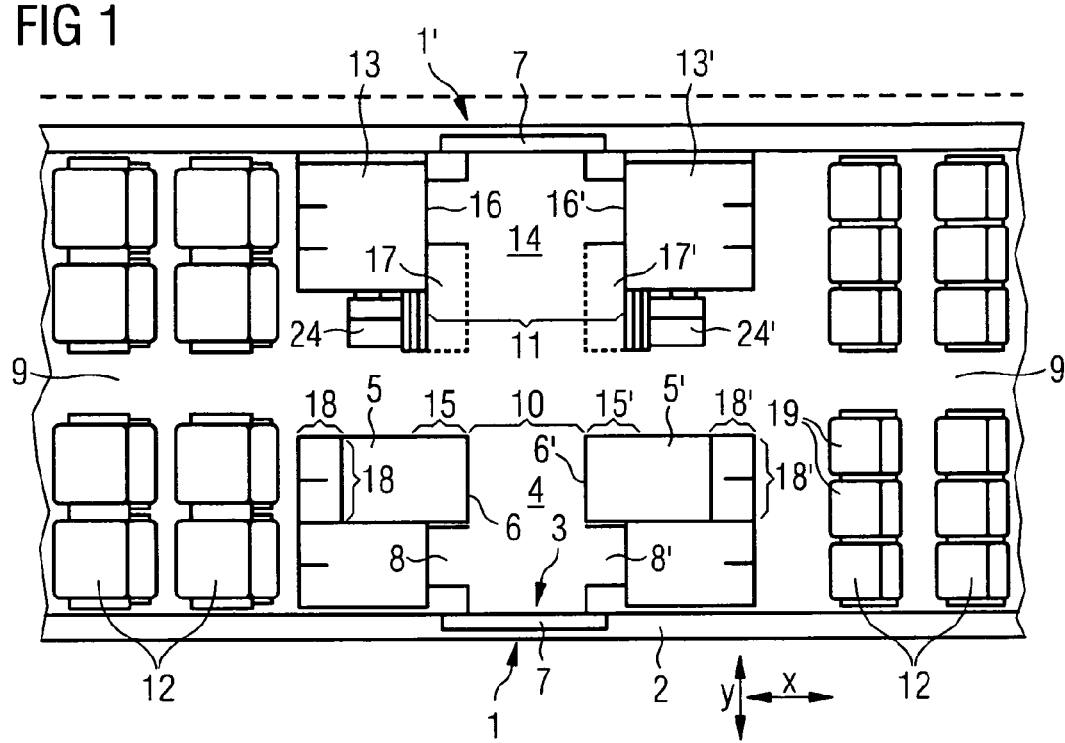
FIG. 1 shows a schematic representation of a top view of an aircraft region according to the invention.

In the figures, components, component groups or regions which are identical or which correspond with one another are identified by the same reference numerals. It is further to be mentioned that the drawings are not necessarily true to scale.

FIG. 1 shows an aircraft region 1 according to the invention in an aircraft 2 according to a first embodiment of the invention (top view of the interior of an aircraft body). The aircraft region 1 has an aisle 4 which leads at a first end into an aircraft door region 3. Passengers can leave the aircraft 2 or enter the aircraft 2 via the aisle 4. The aircraft door region 3 has an aircraft door 7. The aircraft region 1 further comprises a monument 5, wherein a side wall 6 of the monument is adjacent to the aisle 4 in such a manner that the side wall 6 forms one (the left) of the lateral boundaries of the aisle 4, and wherein a niche 8 is formed in a portion of the side wall 6 of the monument 5 facing the aircraft door 7, which niche 8 is so configured that it is able to accommodate a standing person wholly or at least for the most part. The aisle 4 leads at a second end into a further aisle 9, via which the passengers can reach a forward part and a rear part of the aircraft 2. Opposite the monument 5 there is a further monument 5', which has a mirror-inverted form/orientation relative to the monument 5. Analogously to the monument 5, the monument 5' has a side wall 6' which is adjacent to the aisle 4 in such a manner that the side wall 6' forms one (the right) of the lateral boundaries of the aisle 4, wherein a niche 8' is formed in a portion of the side wall 6' of the monument 5' facing the aircraft door 7, which niche 8' is so configured that it is able to accommodate a standing person wholly or at least for the most part. Rows of seats 12 for passengers are also to be seen in FIG. 1, which rows of seats 12 are arranged next to the monuments.

In addition to creating space for the cabin crew without obstructing the passengers as they enter and leave, the formation of the niches 8, 8' in the monuments 5, 5' has the further advantage that additional space 15, 15', which projects into the aisle 4, is available for the monuments 5, 5'.

Opposite the aircraft region 1 is a further aircraft region 1' which likewise has two opposing monuments 13, 13', between which there runs an aisle 14 which leads into the aisle 9. On the end faces of the monuments 13, 13' facing the aisle 9, seats 24 for the cabin crew are provided. However, the side walls 16, 16' of the monuments 13, 13' that are adjacent to the aisle 14 do not have niches. As a result, no additional space comparable to the space 15, 15' is available for the monuments 13, 13'. In other words, a width 11 of the aisle 14 in a region adjacent to the aisle 9 is greater than a width 10 of the aisle 4 adjacent to the aisle 9. However, the width 10 is adequate for the safety standards. In order to make use of the advantages of increased safety for the cabin crew and increased usable space for monuments in the aircraft region 1' too, additional monuments 17, 17' (which can be used e.g., as stowage space) can be provided, as is indicated by dotted lines.

The monuments 5, 5' have an L-shaped footprint which, starting from the aircraft door region 3, extends along the aisle 4 (i.e., in the y-direction) into the aircraft interior and then bends in order to project along the longitudinal axis of the aircraft (i.e., in the x-direction) in the direction towards the middle of the aisle 4. The projecting portion is identified by the reference numerals 15, 15'. As an alternative, it is possible to omit the portions of the monuments 5, 5' identified by reference numerals 18, 18' and thus obtain a footprint which is characterised by two rectangles offset relative to one another in the x-direction. In this variant, the area of the monuments 5, 5' would be reduced as compared with the L-shaped footprint, but the passengers in the seats 19 would have more leg room.

Figure 2:
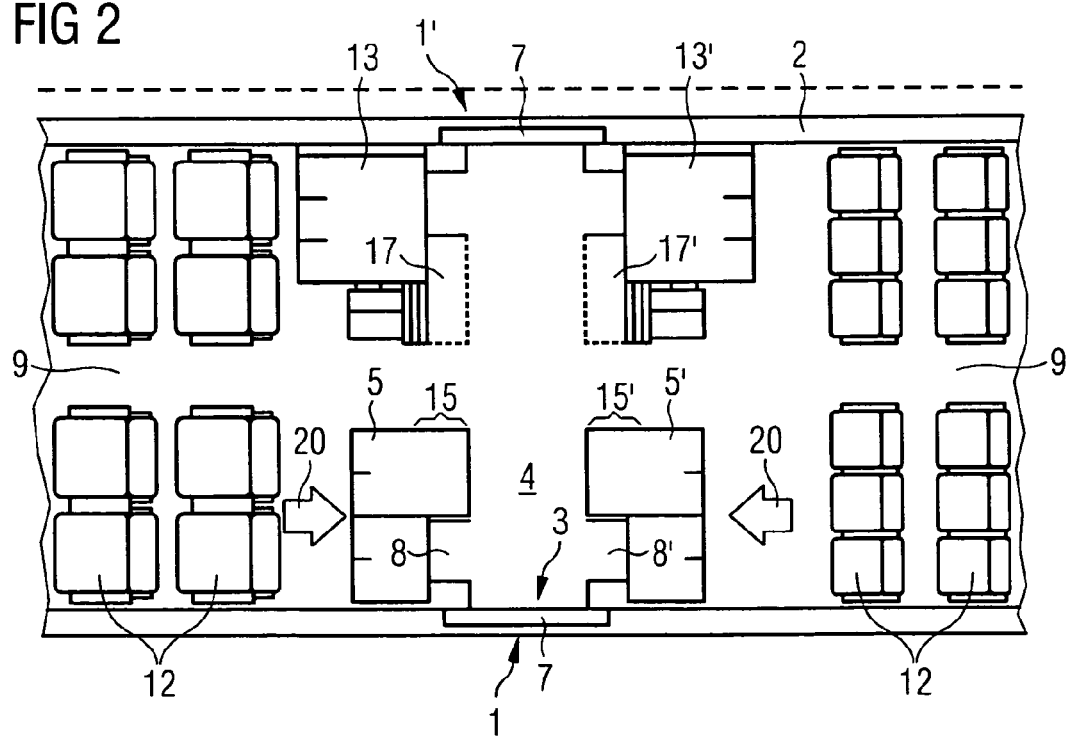
FIG. 2 shows a schematic representation of a top view of a further aircraft region according to the invention.
Figure 5:
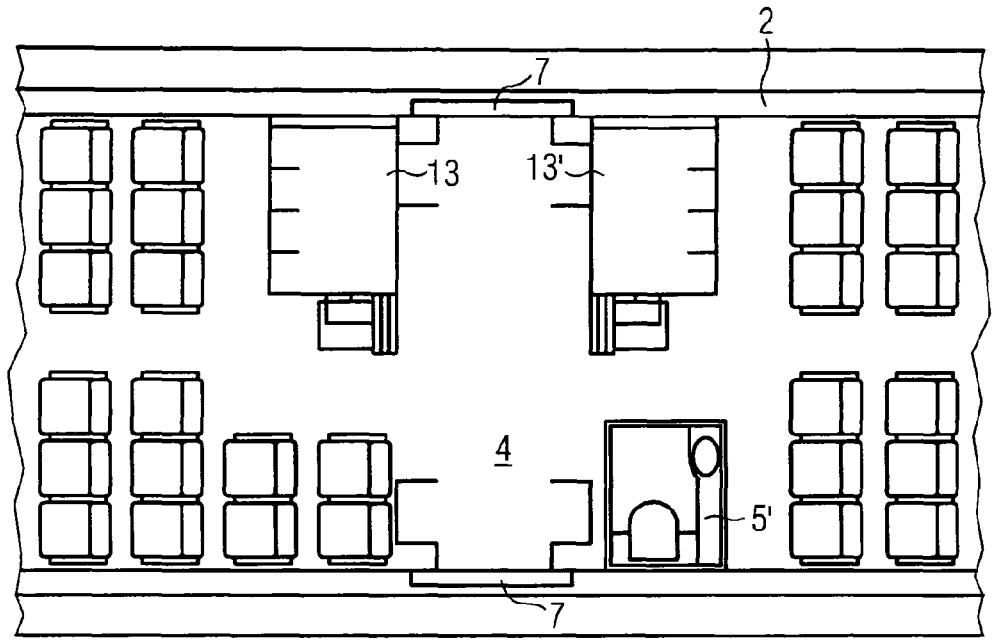
FIG. 5 shows a schematic representation of a top view of an aircraft region.
Figure 6:
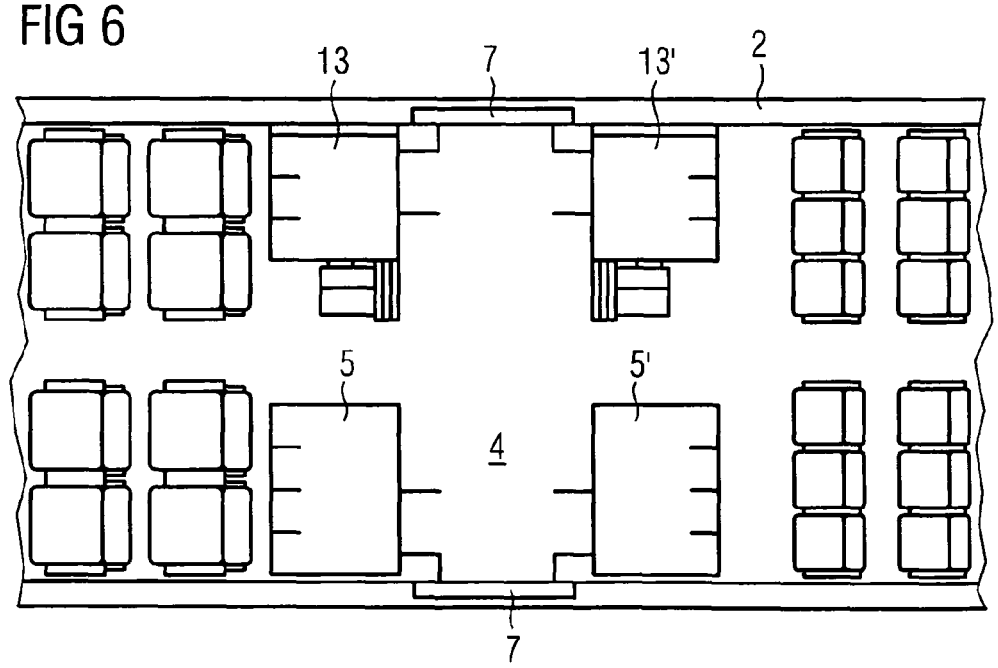
FIG. 6 shows a schematic representation of a top view of a further aircraft region.

The embodiment shown in FIG. 2 likewise has monuments 5, 5' which have an L-shaped footprint. Compared with the L-shaped variant shown in FIG. 1, however, the widths of the monuments 5, 5' in FIG. 2 are smaller, as is indicated by the arrows 20. As a result, more leg room or stowage space is created. However, the smaller width of the monuments 5, 5' in FIG. 2 is made up for at least partly as compared with conventional solutions (see FIGS. 5 and 6) in that the monuments 5, 5' have an L-shaped footprint and accordingly make use of additional space (projecting portions 15, 15') which remains unused in conventional monuments.

Although the monuments 5, 5' and 13, 13' shown in FIGS. 1 and 2 are here shown as galley facilities, they can be used for very different purposes, for example as a lavatory facility or as a stowage facility. The monuments 5, 5' and 13, 13' can also be a combination of these facilities.

The embodiment shown in FIG. 3 differs from the embodiment shown in FIG. 1 in that there is only one monument 5' adjacent to the aisle 4 on the right-hand side. On the left-hand side there is not a monument but a row of seats 12 adjacent to the aisle 4. A further difference is that the length of the monument 5' (in the y-direction) is shorter as compared with the length of the monument 5' in FIG. 1. This in turn allows the length of the monuments 13, 13' to be increased. The shortening of the length of the monument 5' is made up for in that additional space is made available by the projecting portion 15' of the monument 5', which is not made use of by conventional monuments. Therefore, the monument 5' can be shortened in its length without losing functionality. In this embodiment, the monument 5' is in the form of a lavatory facility. However, it could also be used for another purpose.

As is shown in FIG. 4, a washbasin 21, which in FIG. 3 is arranged together with a fitting 23 on a side wall 22 which represents the side wall of the monument 5' that is remote from the aisle 4, can be moved into the projecting portion 15' (i.e., into an end of the foot of the L-shaped footprint that is adjacent to the aisle 4). The entire fitting on the side wall 22 can accordingly be omitted, as a result of which the width of the monument 5' can again be reduced, as is indicated by the arrow 20. A width of the monument 5' of, for example, 28" should be sufficient for minimum comfort in the region of the lavatory 25 (if the washbasin 21 is moved into the projecting portion 15').

FIGS. 5 and 6 again show, for comparison, conventional solutions for aircraft regions in which no niche is formed in the monuments 5, 5' and accordingly the area next to the assist space is not used.

It has already been explained in the preceding description that, because of official regulations regarding the assist space, unused areas are often created in the door region of aircraft, for example in the y-direction next to the assist space. Conventional monuments have a rectangular footprint and are usually pushed directly up to the assist space in the x-direction, the adjacent free area often remaining unused. According to the invention, these areas are used, it being possible for layouts to be found which can accommodate a maximum number of passengers. In the embodiments shown in FIGS. 1 to 4, for example, space corresponding to half a seat row can be saved per optimised monument.

The area next to the assist space is used according to the invention, for example, to accommodate lavatory components. The lavatory can accordingly be moved closer to the cross aisle. Alternatively, the space gained can be used as stowage space, for example for emergency equipment. Alternatively, the space gained can also be used to increase the volume of the galley. The space gained can be used in the lower region for a further half-size trolley and in the upper region to increase the stowage space or the working area. The space could also be used to accommodate a galley cooling system. If the galley is shortened in the x-direction or y-direction, the trolley volume is reduced slightly.

By replacing the rectangular footprints of the monuments by, for example, L-shaped footprints or other footprints adapted to the door region, better use can accordingly be made of the floor space in the door region.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. Aircraft region comprising:
   an aisle which leads into an aircraft door via which passengers can leave the aircraft or enter the aircraft, wherein an opening of the door extends generally perpendicularly to the aisle; and
   at least one monument located adjacent to the door and wherein the monument is a lavatory, comprising
   a footprint which contains first and second rectangles offset relative to one another along the longitudinal axis of the aircraft, wherein:
   the first rectangle has a plurality of sides,
   the second rectangle has a further plurality of sides,
   a first sidewall of the first rectangle, corresponding to one of the plurality of sides of the first rectangle, and a first sidewall of the second rectangle, corresponding to one of the further plurality of sides of the second rectangle, form a portion of a lateral boundary of the aisle and,
   the first rectangle is positioned farther away from the aircraft door region than the second rectangle,
   a second sidewall of the first rectangle, corresponding to one of the plurality of sides of the first rectangle, extends inwardly in a direction towards the aisle relative to the first sidewall of the second rectangle,
   the first sidewall of the second rectangle is arranged transverse to the second sidewall of the first rectangle through a first point on the second sidewall of the first rectangle and is adjacent a sidewall of the aircraft in which the door opening is formed such that a niche is formed and is located immediately adjacent to the door, wherein a second portion of the lateral boundary of the aisle is formed by a portion of the second sidewall of the first rectangle,
   the niche is bordered on a first lateral side extending generally parallel to the longitudinal direction by the second sidewall of the first rectangle, on a second side extending generally parallel to the longitudinal direction by the sidewall of the aircraft and on a third side extending generally perpendicular to the longitudinal direction by the first sidewall of the second rectangle, wherein one of a toilet and a washbasin is provided in the first rectangle between the first sidewall of the first rectangle and the first point on the second sidewall of the first rectangle, and wherein the other of the toilet and the washbasin is provided in the second rectangle of the monument adjacent the aircraft sidewall, wherein a boundary of the niche causes the footprint of the monument to be non-rectangular, and
   an adult person standing in the niche adjacent to the first sidewall of the second rectangle does not project outwardly into the aisle with respect to the first sidewall of the first rectangle and does not project outwardly into the aisle with respect to a first side of the opening of the door.

2. The aircraft region according to claim 1, wherein dimensions of the niche are configured to accommodate one or more crew members.

3. The aircraft region according to claim 1, wherein the at least one monument comprises a first and a second monument which are located opposite one another in such a manner that the aisle runs between them.

4. The aircraft region of claim 1, wherein handles are provided inside the niche for the adult to hold onto.

5. An aircraft having at least one aircraft region according to claim 1.

* * * * *